United States Patent
Pophale et al.

(10) Patent No.: US 10,421,435 B2
(45) Date of Patent: Sep. 24, 2019

(54) VEHICLE AUTHENTICATION SYSTEM

(71) Applicant: LEAR CORPORATION, Southfield, MI (US)

(72) Inventors: Sachin Pophale, Maharashtra (IN); Gaddam Sachin Kranthi Kumar, Maharashtra (IN)

(73) Assignee: Lear Corporation, Southfield, MI (US)

( * ) Notice: Subject to any disclaimer, the term of this patent is extended or adjusted under 35 U.S.C. 154(b) by 639 days.

(21) Appl. No.: 14/789,039

(22) Filed: Jul. 1, 2015

(65) Prior Publication Data

US 2017/0001598 A1  Jan. 5, 2017

(51) Int. Cl.
    *B60R 25/24* (2013.01)
    *G06K 7/10* (2006.01)
    *B60R 25/04* (2013.01)

(52) U.S. Cl.
    CPC ............ *B60R 25/243* (2013.01); *B60R 25/24* (2013.01); *B60R 2325/205* (2013.01)

(58) Field of Classification Search
    CPC ...... B60R 25/04; B60R 25/241; G06K 7/1092
    See application file for complete search history.

(56) References Cited

U.S. PATENT DOCUMENTS

| | | | | |
|---|---|---|---|---|
| 5,983,347 A | * | 11/1999 | Brinkmeyer | B60R 25/04 307/10.2 |
| 8,494,439 B2 | | 7/2013 | Faenger | |
| 8,768,565 B2 | * | 7/2014 | Jefferies | G07B 15/00 701/29.6 |
| 8,943,187 B1 | * | 1/2015 | Saylor | G06F 21/6209 709/223 |
| 9,162,648 B1 | * | 10/2015 | Weng | B60R 25/24 |
| 9,514,586 B2 | * | 12/2016 | Rogers | G07C 9/00182 |
| 2001/0035813 A1 | * | 11/2001 | Meier | B60R 25/24 340/5.72 |
| 2001/0049569 A1 | * | 12/2001 | Gehrke | B60R 25/04 701/1 |
| 2014/0160276 A1 | | 6/2014 | Pliefke et al. | |
| 2014/0293753 A1 | * | 10/2014 | Pearson | G08C 23/02 367/197 |

FOREIGN PATENT DOCUMENTS

DE   102012218123 B4   9/2014

* cited by examiner

*Primary Examiner* — Anand S Rao
*Assistant Examiner* — Tyler B Edwards
(74) *Attorney, Agent, or Firm* — Brooks Kushman, P.C.

(57) ABSTRACT

A vehicle authentication system may include a controller configured to detect a trigger event, activate at least one camera, transmit a unique identifier to a mobile device, receive an image from the at least one camera, and grant access to the vehicle in response to the image including the unique identifier.

18 Claims, 4 Drawing Sheets

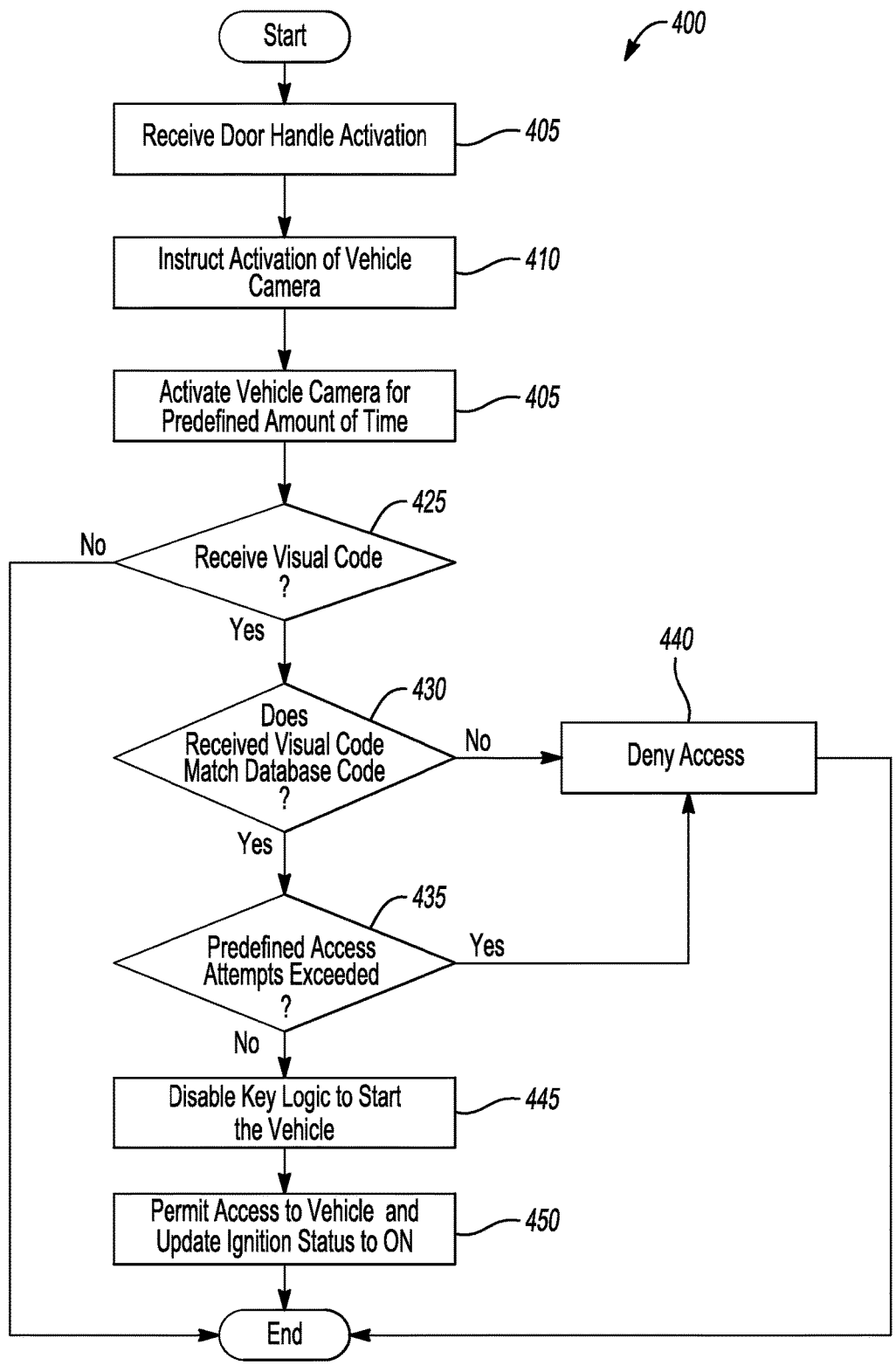

VEHICLE AUTHENTICATION SYSTEM

TECHNICAL FIELD

Embodiments disclosed herein generally relate to accessing an interior cabin of a vehicle.

BACKGROUND

Vehicles often authenticate users and unlock in response to recognizing the presence of a trusted key, such as a key fob. However, due to the increasing use of keyless entry systems, users often misplace or forget their keys. Replacement keys may be expensive, and gaining access to a locked vehicle without a key may require a user to contact an authorized service center.

SUMMARY

A vehicle authentication system may include a controller configured to detect a trigger event, activate at least one camera, transmit a unique identifier to a mobile device, receive an image from the at least one camera, and grant access to the vehicle in response to the image including the unique identifier.

A vehicle authentication system may include a camera and a controller configured to determine a trigger event, activate the camera, receive a unique image from the camera, compare the received image with at least one stored image, and unlock at least one vehicle door in response to the received image and stored image matching.

A non-transitory computer-readable medium tangibly embodying computer-executable instructions of a software program, the software program being executable by a processor of a computing device to provide operations, may include to activate at least one vehicle camera in response to a trigger event, transmit a unique identifier to a mobile device, receive an image from the at least one vehicle camera, and grant access to the vehicle in response to the image including the unique identifier.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 4 illustrates another example process for authenticating a user via the authentication system in accordance with one embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Often times drivers misplace their keys or key fobs and thus cannot unlock, drive or otherwise access their vehicle. In response to this, drivers may often call an administrator or authorized service center who may remotely unlock the vehicle. The driver may also call a friend or family member to locate a spare set of keys. However, these methods are often burdensome and time consuming. Moreover, replacement keys are often expensive. Providing temporary access and operation of a vehicle may allow the user enough time to find or retrieve his or her key, without contacting a third party for help.

Disclosed herein is a vehicle authentication system that may authenticate a user based on an image or unique identifier made available via a user's mobile device. A vehicle camera may capture the image, and a controller may authenticate the user based on the image. In one example, the image may be a Quick Response (QR) Code unique to the driver and capable of authenticating the driver when compared to a stored code associated with the driver in a database.

The vehicle camera may be any camera on or within the vehicle. For example, the vehicle camera may be a back-up camera arranged on the rear of the vehicle (i.e., rear-mounted camera). The camera may be activated when the vehicle is running, but otherwise may not be continually turned on. The camera may be turned on in response to a trigger event. The trigger event may be initiated by the user and may include a unique sequence of events such as pulling a vehicle door handle three times, or folding in a vehicle minor twice. Upon recognizing the trigger event, the controller may activate the camera. Also, upon recognizing the trigger event, the controller may instruct the unique image to be transmitted to the mobile device via a wireless connection between the vehicle and the mobile device. The user may then place the mobile device showing the received image in front of the activated camera. The camera may capture the image and the controller may compare the image to at least one authorized image, and proceed to unlock the vehicle in response to a match between the images.

Accordingly, the vehicle authentication system provides for a secure, user-friendly system for gaining access to a vehicle in the case of a missing or lost key. The system uses many existing vehicle features and prevents unnecessary power consumption.

Figure 1:
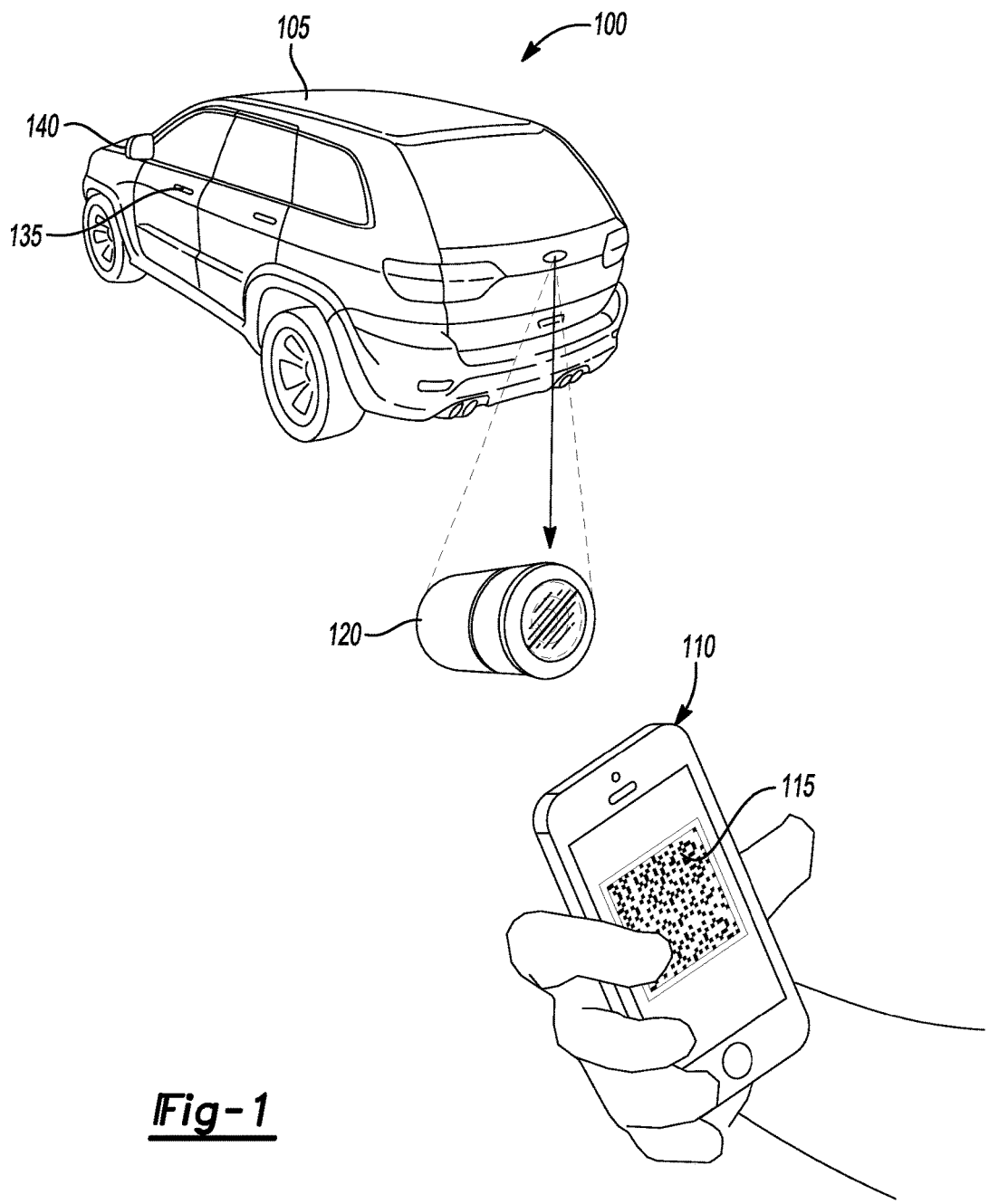
FIG. 1 illustrates an example vehicle authentication system in accordance with one embodiment.
Figure 2:
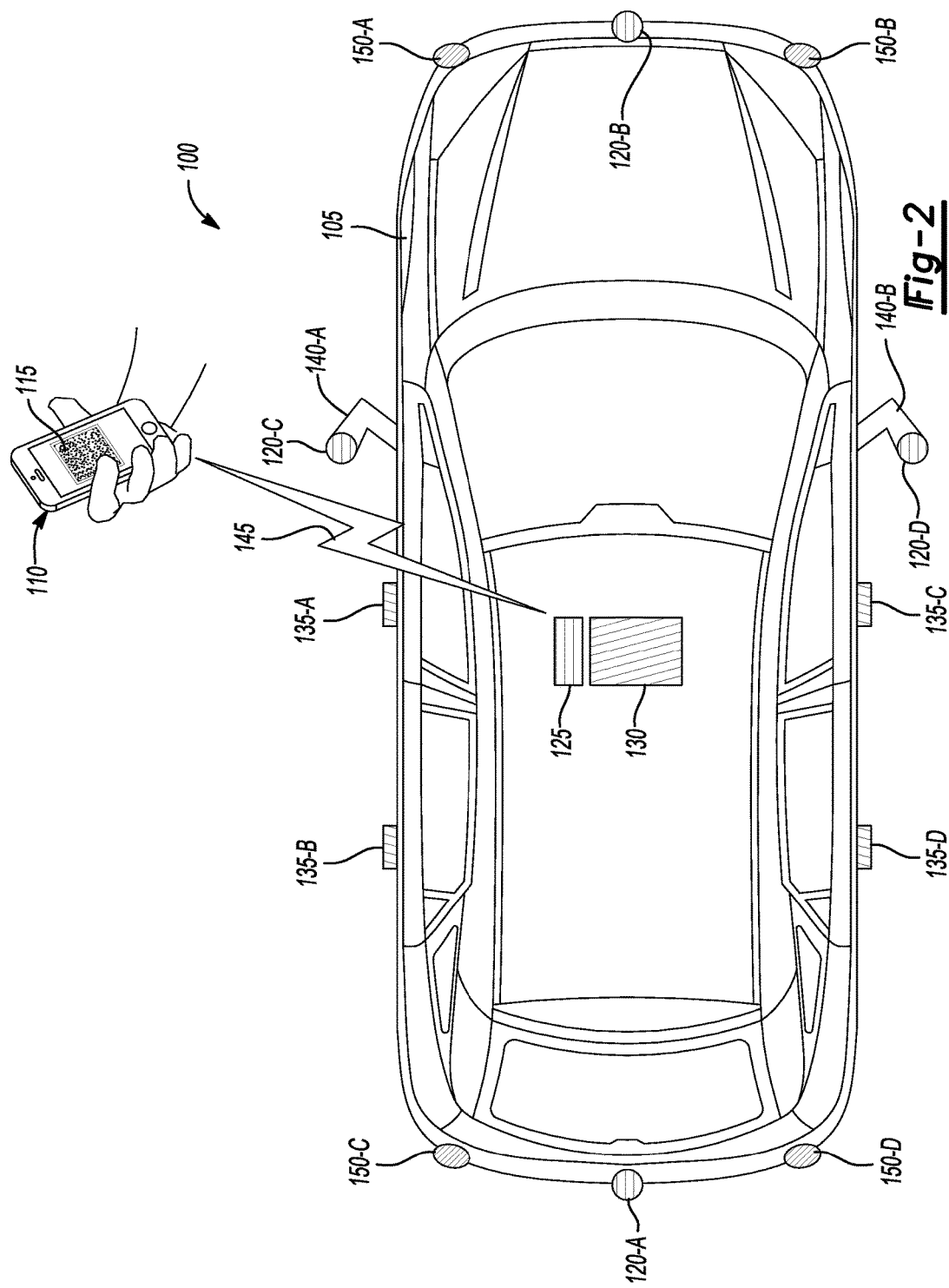
FIG. 2 illustrates further details of the example vehicle authentication system as shown in FIG. 1 in accordance with one embodiment.

Referring to the Figures, FIG. 1 illustrates an example vehicle authentication system 100 including a vehicle 105 and a mobile device 110. The mobile device 110 may include an interface 115 configured to display a unique image or visual identifier such as a QR code. The vehicle 105 may include at least one camera 120 configured to capture the visual identifier. The vehicle 105 may include at least one door handle 135 and mirror 140. The at least one door handle 135 and mirror 140 may be used to receive an indication of a lost key. In one example, a user may pull or actuate the door handle 135 three consecutive times. This may trigger a controller 130 (as shown in FIG. 2) to transmit the visual identifier to the mobile device 110, as well as activate the camera 120. The user may then place the interface 115 displaying the received visual identifier in front of the camera 120. The camera 120 may capture the image and the controller 130 may compare the visual identifier included in the captured image to at least one authenticated identifier within a database (not shown).

FIG. 2 illustrates further details of the vehicle authentication system 100. FIG. 2 illustrates a top view of the vehicle 105. The vehicle 105 may include a plurality of door handles 135-A-135-D (collectively referred to as handle 135 or handles 135). The vehicle 105 may also include at least two mirrors 140-A, 140-B (collectively referred to as mirror 140 or mirrors 140.) The vehicle 105 may include a plurality of cameras 120-A-120-D (collectively referred to as camera 120 or cameras 120). The cameras 120 may include a back-up camera 120-A, as shown by way of example in FIG. 1, front camera 120-B, and mirror or blind spot cameras 120-C, 120-D. Each of the cameras 120 may be configured to capture an image, such as the visual identifier on the mobile device 110. The cameras may be still cameras or video cameras capable of recording images and/or video. In some example, the cameras 120 may already be integrated into vehicle systems and may be configured to be used for certain driving features, such as blind spot warnings, parking aids, birds-eye view generation, etc. Additional cameras other than those shown in FIGS. 1 and 2 may be arranged around and within the vehicle 105 to further capture and provide images to the controller 130.

The vehicle 105 may include a wireless transceiver 125 configured to create a wireless connection 145 between the vehicle 105 and the mobile device 110. The wireless connection 145 may be a BLUETOOTH connection, or other wireless connection such as Wi-Fi, ZIGBEE, or other wireless protocol. By facilitating communication between the mobile device 110 and the vehicle 105, the user's mobile device 110 may receive and transmit information and data with the vehicle 105.

The vehicle 105 may include a plurality of motion sensors 150-A-150-D (collectively referred to as motion sensors 150). These motion sensors 150 may be used to gather information about the vehicle environment such as surrounding objects, and the distance thereto in relation to the vehicle 105. The motion sensors 150 may provide certain distance data indicative of the surrounding objects, which may in turn be used by a parking aid system, or accident warning system. The motion sensors 150 may be ultrasonic or infrared sensors, for example.

The controller 130 may have one or more processors and a memory. The controller 130 may be configured to receive wireless transmitted information via the wireless transceiver 125 and to perform certain instructions, commands, and other routines in support of the processes described herein. The controller 130 may be a body control module (BCM) and/or electrical control unit (ECU) which may interface with various vehicle modules, systems and components, including but not limited to the cameras 120, door handles 135, wireless transceiver 125, mirrors 140, motion sensors 150, as well as navigation systems, accident warning systems, heads-up displays, radio, unlocking, security modules, etc.

The controller 130 may also be a camera control unit and/or an audio head unit. The controller 130 may also be other electrical module configured to control locking or unlocking of the vehicle 105.

The memory of the controller 130 may be a computer-readable storage medium (also referred to as storage and/or database herein). The medium may be non-transitory (e.g., a tangible medium) that provides instructions or other data that may be read by the processor of the controller 130. Instructions may be compiled or interpreted from computer programs created using a variety of languages and/or technologies, including, but not limited to, Java, C, C++, C#, Objective C, Fortran, Pascal, Java Script, Python, Perl, and PL/SQL.

The controller 130 may be programmed to authenticate a user based on the unique visual identifier captured at the camera 120 and unlock the doors in response to the authentication. The controller 130 may also enable other vehicle modules and systems in response to the authentication. In one example, the controller 130 may permit all vehicle features to function as if the user's key was present. This may include updating certain status' and other conditions so that the vehicle may be freely used by the user. In one situation, this may include updating an ignition status to ON to enable engine start. The controller 130 may also disable certain rules and constraints placed on the vehicle 105 such as disabling key logic that would prevent unlocking the doors unless the key is present. In other examples, some, but not all features may be enabled.

The controller 130 may be programmed to recognize and pair with the mobile device 110 via the wireless connection 145. This pairing may be automatically achieved as the user approaches the vehicle via BLUETOOTH, or another wireless communication between the vehicle 105 and the mobile device 110. Upon recognizing the mobile device 110, the controller 130 and the mobile device 110 may communicate with each other via the wireless connection 145. This may include sending and receiving authentication data.

In the event that a user has lost or misplaced his or her vehicle key or key fob, it may be difficult, if not impossible to gain access to the vehicle 105, let alone operate the vehicle 105. Using the unique identifier, the controller 130 may facilitate a secondary authentication using the mobile device 110 and one of the vehicle cameras 120. When a user realizes he or she has lost the vehicle key, he or she may initiate a trigger event. The trigger event may be an action, or series of actions, taken at the vehicle 105 that may be recognized by the vehicle 105 such as actuating the vehicle handles 135 or mirrors 140, or a combination of both.

The trigger event may be any event at the vehicle 105. It may be a unique sequence of actions that are not typically used in the normal course of use of the vehicle 105. For example, pulling a door handle once may be a typical action used to open a vehicle door. However, pulling a door handle three consecutive times may not be. In another example, folding and unfolding a rear view mirror 140 two consecutive times may not be a typical action and may also be used as a trigger event.

Other trigger events are possible. In another example, moving the windshield wipers, front or rear, may act as a trigger event. The trigger event may also be recognized by the motion sensors 150. The user may move his or her hand in front of one of the motion sensors 150 multiple times. The motion sensors 150 may recognize the close range motion. Any combination of activities may also be used as a trigger. For example, a sequence including a door handle pull followed by a mirror fold may serve as a trigger event.

The controller 130 may recognize the actions making up the trigger event by receiving data indicative of the actions from the various vehicle modules associated with the vehicle components. For example, the controller 130 may receive data indicative of a door handle pull and may determine whether two consecutive, or near consecutive door handle pulls are recognized (e.g., determine whether three door handle pulls recognized within five seconds of each other.)

Once the controller 130 recognizes a trigger event, the controller 130 may determine that authentication is being requested from the user. The controller 130 may generate a visual identifier and transmit the visual identifier to the mobile device 110 via the wireless connection 145. Once the visual identifier is transmitted, the controller 130 may activate the camera 120. Each of the cameras 120 may be activated, or only a subset may be activated. By waiting to activate the exterior cameras 120 until after a trigger event has been recognized, power consumption, as well as wear and tear on the cameras, is conserved. That is, the cameras 120 are not 'awoken' until needed.

Once the camera 120 is activated, the user may place the mobile device 110 in front of the camera. The interface 115 of the mobile device 110 may show the visual identifier, which may be captured by the camera 120. The visual identifier, which was issued by the controller 130, may be any number of unique identifiers. In the example shown in FIGS. 1 and 2, a QR code is illustrated. Other examples may include bar codes, or other one-dimensional or two-dimensional patterns, which may include certain universal product codes (UPCs), code 128, maxicode, datamatrix, PDF 417, code 3 of 9, code 12 of 5, etc.

Because the code, or unique visual identifier, is transmitted to the mobile device 110 after recognition of the trigger event, the code is not continually stored on the mobile device 110. Instead, each time access is requested to the vehicle 105, a new unique identifier may be transmitted to the mobile device 110, creating a more secure and reliable system. In another example, the code may 'expire', after a certain amount of time (e.g., 24 hours) or uses (e.g., 5 uses). For example, after a predefined amount of time has lapsed, the code may not be used to gain access to the vehicle 105. In another example, after the code has been used a predefined number of times, the code may also expire.

The controller 130 may generate the visual identifier using any number of techniques. It may randomly and dynamically generate the identifier and store the identifier in memory, or a separate database. Additionally or alternatively, visual identifiers may be generated by the vehicle OEM and a plurality of reusable codes may be stored or maintained either remotely by the OEM, or within the processor memory.

Once the camera 120 captures an image including the visual identifier from the mobile device 110, the controller 130 may compare the captured identifier to the stored identifier. If the identifiers match, or nearly match, the controller 130 may proceed to permit access to the vehicle 105 and the vehicle features.

The trigger event may be unique to a specific driver or vehicle. For example, each vehicle 105 may have a unique, predetermined trigger sequence used solely for the purpose of gaining access to that specific vehicle 105, in the event of key loss. Additionally, the controller 130 may be configured to transmit the visual identifier to a recognized mobile device 110 that has previously been paired with the vehicle 105. Thus, a non-authorized person, even if he or she knew the trigger sequence, would not receive the visual identifier. Additional verification may be included via a mobile device application in which a password and username may be required prior to transmitting the visual identifier. Thus, a secure, yet easy to use process may be implemented for authorizing a user.

Figure 3:
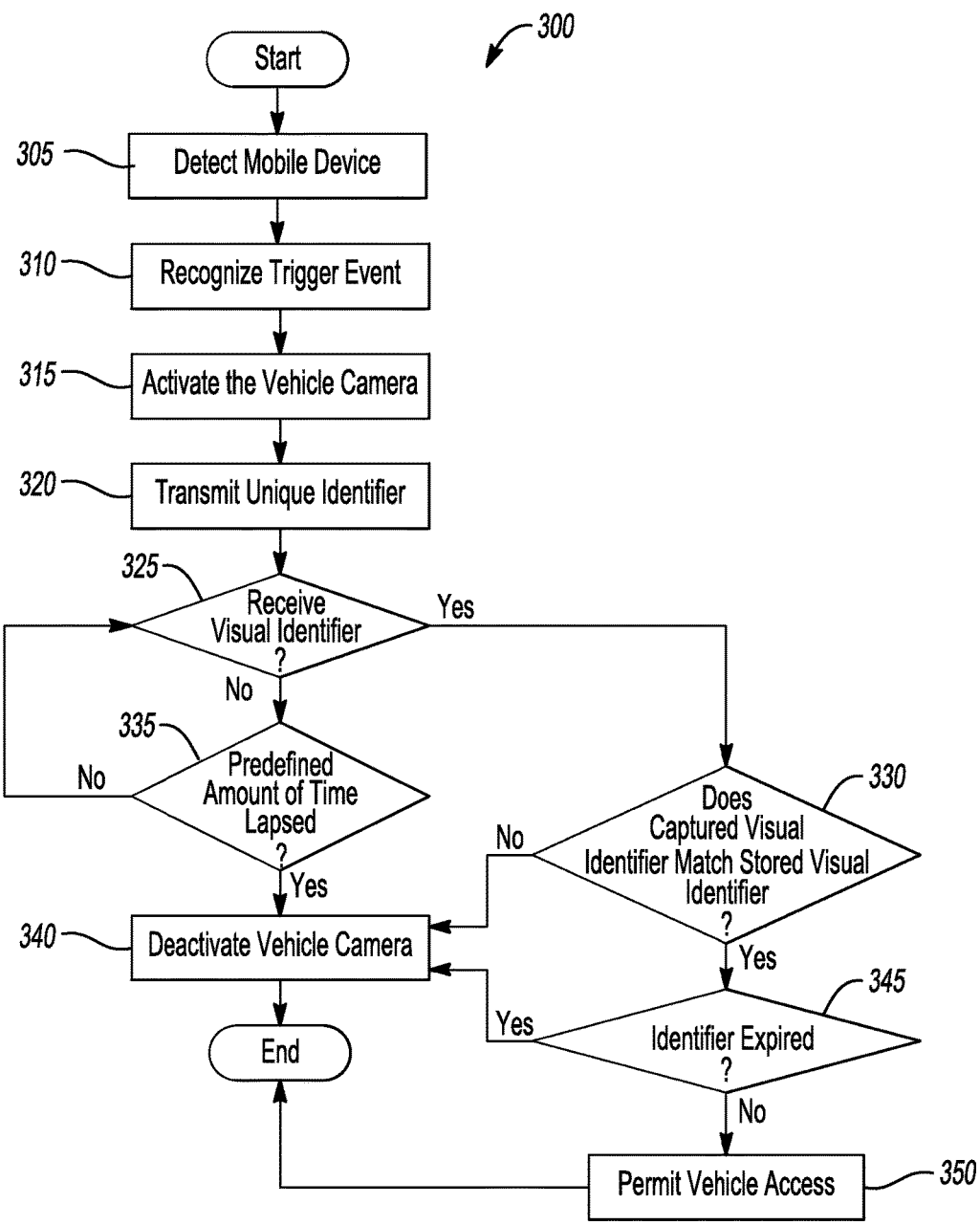
FIG. 3 illustrates an example process for authenticating a user via the authentication system in accordance with one embodiment.

FIG. 3 illustrates an example process 300 for authenticating a user. The process 300 begins at block 305.

At block 305, the controller 130 may detect the mobile device 110 via the wireless connection 145. The controller 130 may recognize, via transmission of data between the mobile device 110 and the vehicle 105, the mobile device 110 and authenticate the mobile device 110.

At block 310, the controller 130 may recognize a trigger event. As explained above, the trigger event may include a trigger sequence of actionable activities at the exterior of the vehicle such as, for example, pulling door handles 135 and folding mirrors 140. The controller 130 may recognize the trigger event by receiving data indicative of the actions from one or more vehicle modules (e.g., module associated with door handles 135 and mirrors 140).

At block 315, the controller 130, in response to recognizing the trigger event and detecting the mobile device 110, may activate at least one of the vehicle cameras 120. That is, at least one camera 120 on the exterior of the vehicle may be enabled, or turned on. In an effort to preserve vehicle power, the camera 120 may not be continually activated or enabled. Typically, the camera 120 may be enabled while the vehicle engine is running, but not otherwise. In a situation of a lost key, it may not be possible to start the vehicle 105, and thus, the camera 120 may be activated in response to the trigger event. By using a unique trigger event or sequence, vehicle power may be preserved, while permitting the possibility of identification of the user via the camera 120.

At block 320, the controller 130 may transmit a unique identifier to the mobile device 110. As explained, the unique identifier may be a QR code capable of being displayed on the mobile device interface 115. The identifier may be transmitted in response to the pairing between the mobile device 110 and the vehicle 105, and in response to the trigger event. A new code may be generated each time a trigger event is recognized and the code may be maintained at the database. Thus, the identifier is not necessarily maintained on the user's mobile device 110 until the vehicle 105 realizes that access to the vehicle 105 is being requested. In another example, the identifier may expire after a certain period of time, such as after 24 hours. The period of time may vary, but may be one that allows the user enough time to locate his or her key, or procure a replacement key. This is described in more detail below with respect to block 345. The identifier may be generated at the vehicle 105, or via a third party remote from the vehicle 105.

At block 325, the controller 130 may determine whether the camera 120 has captured an image and whether that image includes the visual identifier. That is, the user may place the mobile device 110 showing the unique identifier in front of the camera 120. The camera 120 may capture an image in response to recognizing an object, such as the mobile device 110, in front of the camera. The camera 120 may then transmit the captured image to the controller 130. If an image has been captured by the camera 120, the process 300 proceeds to block 330. If not, the process 300 proceeds to block 335.

At block 335, the controller 130 determines whether a predefined amount of time has lapsed since the transmission of the unique identifier. The predefined amount of time may be approximately 30 seconds, but may be anywhere from approximately 15 seconds to 180 seconds, or more. If the predefined amount of time has not lapsed, the process 300 returns to block 325 where the controller 130 waits to receive an image. If the predefined amount of time has lapsed, the process 300 proceeds to block 340.

At block 340, the controller 130 instructs the camera 120 to deactivate, or turn off. The process 300 then ends.

At block 330, the controller 130 may determine whether the captured identifier matches the stored identifier. The controller 130 may compare the generated identifier stored in the database with the identifier within the image captured by the camera 120. If the two images are the same, or substantially similar within a certain degree, the process 300 may proceed to block 345. If not, the process 300 may proceed to block 340.

At block 345, the controller 130 may determine whether the identifier has expired. The identifier may expire after a certain amount of time (e.g., 24 hours) or uses (e.g., 5 uses). That is, the identifier may be used to permit access for a reasonable amount of time so that the user may procure a replacement key. The identifier may not be intended to be used a key substitute. If the identifier has expired, the process 300 proceeds to block 340. If not, the process 300 proceeds to block 350.

At block 350, the controller 130 may permit vehicle access in response to a valid, unexpired unique identifier being captured at the vehicle camera 120. Vehicle access may include unlocking the vehicle doors and allowing for operation of the vehicle 105 (e.g., driving of the vehicle 105). As mentioned above, the controller 130 may permit all vehicle features to function as if the user's key was present. The process 300 may then end.

FIG. 4 illustrates another example process 400 for authenticating a user, similar to process 300 of FIG. 3 described above. The process 400 begins at block 405.

At block 405, the controller 130 may detect three consecutive door handle pulls. The door handle pulls may trigger the controller 130 to activate the camera 120 at block 410. At block 415, the controller 130 may instruct the camera 120 to activate for a predefined amount of time, such as 30 seconds, after receiving instructions from the controller 130.

At block 425, the controller 130 may wait for the camera 120 to capture the visual code (e.g., unique visual identifier). If a code is captured, the process 400 proceeds to block 430, if not, the process ends. At block 430. The controller 130 determines whether the received visual code matches the code stored in the database. If so, the process 400 proceeds to block 435. If not, access to the vehicle 105 is denied at block 440.

At block 435, the controller 130 determines whether a predefined amount of access attempts (via the image) have been exceeded. If so, the process 400 proceeds to block 440 where access to the vehicle 105 is denied. If not, the process 400 proceeds to block 445. At block 445, the controller 130 may disable any key logic preventing access to the vehicle 105 and may permit access and update an ignition status to ON at block 450. The process 400 may then end.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle authentication system, comprising:
a controller configured to:
  detect a trigger event including a sequence of interactions with at least one exterior component of the vehicle;
  in response to the trigger event, activate at least one vehicle camera and transmit a unique identifier to a mobile device;
  receive an image from the at least one camera; and
  grant access to the vehicle in response to the image including the unique identifier.

2. The system of claim 1, wherein the controller is further configured to communicate with the mobile device via a wireless connection formed between the controller and the mobile device.

3. The system of claim 1, wherein to grant access to the vehicle includes unlocking at least one vehicle door in response to the image including the unique identifier.

4. The system of claim 1, wherein the controller is further configured to enable a number vehicle features in response to the image including the unique identifier, the vehicle features including updating an ignition status to enable vehicle engine start.

5. The system of claim 1, wherein the controller is further configured to:
  determine whether the image includes the unique identifier; and
  determine whether the unique identifier is expired.

6. The system of claim 5, wherein to determine whether the unique identifier is expired includes determining whether a predefined amount of time has lapsed.

7. The system of claim 5, wherein to determine whether the unique identifier is expired includes determining whether a predefined number of images including the unique identifier have been received.

8. The system of claim 1, wherein the unique identifier is at least one of a Quick Response (QR) code and bar code.

9. The system of claim 1, wherein the trigger event includes a series of sequential actuations of a vehicle door handle.

10. The system of claim 1, wherein the trigger event includes a series of sequential actuations of at least one of a vehicle door handle and a vehicle mirror.

11. The system of claim 1, wherein the trigger event includes a movement of a vehicle windshield wiper.

12. A vehicle authentication system, comprising:
a camera; and
a controller configured to:
  determine a trigger event including a sequence of interactions with at least one exterior component of the vehicle;
  activate the camera in response to the trigger event;
  transmit a unique identifier to a mobile device in response to the trigger event;
  receive a unique image from the camera;
  compare the unique image with the unique identifier; and
  unlock at least one vehicle door in response to the unique image and unique identifier matching.

13. The system of claim 12, wherein the controller is further configured to determine whether the unique image includes the unique identifier.

14. The system of claim 13, wherein the controller is further configured to determine whether the unique identifier is expired.

15. The system of claim 12, wherein the unique identifier includes a Quick Response (QR) code.

16. The system of claim 12, wherein the controller is further configured to communicate with a mobile device via a wireless connection and transmit the unique identifier to the mobile device in response to the trigger event.

17. The system of claim 12, wherein the camera is a rear-mounted camera.

18. A non-transitory computer-readable medium tangibly embodying computer-executable instructions of a software program, the software program being executable by a processor of a computing device to provide operations, comprising:
  activating at least one vehicle camera in response to a trigger event;
  transmitting a unique identifier to a mobile device;
  receiving an image from the at least one vehicle camera; and
  granting access to the vehicle in response to the image including the unique identifier.

* * * * *